United States Patent Office 3,186,922
Patented June 1, 1965

---

3,186,922
PROCESS FOR RECOVERING PURE YEASTS
Alfred Champagnat, Levalloos, France, assignor to The British Petroleum Company Limited, London, England, a British joint-stock corporation
No Drawing. Filed Aug. 15, 1961, Ser. No. 131,471
Claims priority, application Great Britain, Aug. 22, 1960, 28,958/60
15 Claims. (Cl. 195—82)

This invention relates to a process for recovering yeasts contained in an emulsion of yeasts and hydrocarbons in an aqueous mineral medium, the recovered yeasts being substantially free from adsorbed hydrocarbons and thus being suitable for use as food products.

Emulsions of this type can be obtained by the biosynthesis of yeasts from hydrocarbons or petroleum fractions in a nutrient aqueous mineral medium comprising essentially the ions necessary for the growth of the microorganisms. If such emulsions are centrifuged using the normal technique which is employed in the manufacture of yeasts from carbohydrates, there is usually obtained, on the one hand, a clear aqueous phase of an aqueous mineral medium, and on the other hand, a more or less viscous emulsion which contains the yeasts, all or part of the hydrocarbons and a certain quantity of aqueous mineral medium.

The yeast is usually recovered in the form of a paste containing a quantity of the aqueous mineral medium. Usually, however, it is not possible to obtain pure yeasts, that is yeasts free of hydrocarbons.

According to the present invention, there is provided a process for the recovery of yeasts which have been grown in the presence of hydrocarbons, which comprises adding, to a mixture of yeast, aqueous mineral medium and hydrocarbon, at least 50 parts per million, and preferably 0.02–0.5%, by weight of a surface active agent and thereafter centrifuging, whereby there is obtained a paste comprising yeast and aqueous mineral medium.

As the surface active agent, there may be used cationic surface active agents such as stearyl-trimethyl ammonium chloride, non-ionic surface active agents, for example the condensates of oleic acid and ethylene oxide, or anionic surface active agents, for example sodium alkyl sulphates.

Preferably, after adding the surface active agent, the mixture is subjected to vigorous mixing and without a further period of growth of the yeast, is thereafter subjected to centrifuging.

If the centrifuge is adapted for the separation of two phases only, the centrifuging is controlled to obtain on the one hand the mixture of the two phases, liquid aqueous mineral medium and hydrocarbons, and on the other hand the pasty phase of yeasts in a certain proportion of aqueous mineral medium. In this case the separation of the hydrocarbons and of the aqueous mineral medium is made subsequently either by decantation or, if necessary, by centrifuging.

The yeast cells obtained in the pasty phase are usually still coated by a certain quantity of hydrocarbons fixed principally by adsorption.

Preferably the yeast paste which is obtained is diluted with an aqueous medium which may be water alone, or water containing surface active agent and/or mineral constituents, and is again centrifuged.

Suitably again, the treating will consist of several stages of dilution and centrifuging; in the initial stages the yeast is diluted with an aqueous medium containing surface active agent and, in the final stages, the yeast is diluted with an aqueous medium free of surface active agents. In the course of the initial stages the yeast is freed from hydrocarbons; in the final stages the yeast is freed from surface active agents.

Preferably, after the stages hereinbefore described, there is provided a washing with pure water, followed by centrifuging to eliminate the mineral salts of the aqueous mineral medium and the surface active agent remaining in the yeast paste.

If the pH of the mixture to be treated is below 7, it should be raised to a value between 7 and 9; this has been found to facilitate the separation of the phases of the emulsion. This pH correction should be made before the first dilution stage of the process.

Separation of the yeast paste is preferably carried out at a slightly elevated temperature, usually above 30° C. but not exceeding 99° C. The higher the temperature the more one can reduce the dose of surface active agent, but one should not reach a temperature which could alter the cells of the yeast. A temperature of about 60° C. is preferred.

It is economically advantageous not to pass to waste the aqueous washing liquids which contain the surface active agent; these aqueous liquids may be recycled and used several times. The hydrocarbons that they contain may be continuously separated by decantation or centrifuging.

Preferably the yeast paste is dried in order to render it biologically stable. Drying may be carried out by methods well known for the drying of food yeast.

The process of this invention is particularly suitable for use in the recovery of food yeasts obtained by maintaining a yeast in a nutrient medium in the presence of a paraffinic feedstock of petroleum origin and a free oxygen-containing gas, preferably air, under conditions favouring growth of the yeast, said feedstock having an average molecular weight corresponding to at least 10 carbon atoms per molecule and separating the yeast from the aqueous medium. Thus there may be used straight run fractions for example kerosenes; gas oils; middle distillate fractions, preferably boiling in the range 150–450° C. Alternatively, there may be used treated fractions, for example slack wax or other wax fractions, for example as are derived by the dewaxing of lubricating oil fractions; and paraffins derived by processes of separation by the use of molecular sieves.

Preferably the yeast which is grown on the paraffinic feedstock is of the family Cryptococcaceae and particularly of the sub-family Crytococcoideae; however, if desired there may be used, for example, ascosporogeneous yeasts of the sub-family Saccharomyceloidae. Preferred genera of the Crytococcoideae sub-family are Torulopsis (also known as Torula) and Candida. Preferred strains of Candida are *Candida tropicalis* and, in particular, *Candida lipolytica* (also known as *Mycotorula lipolytica*). This process for growing yeasts is described in our co-pending U.S. application Ser. No. 131,470, filed August 15, 1961.

Finally, the process of the invention is applicable not only to emulsions containing hydrocarbons and yeasts but equally to emulsions containing any microorganisms with hydrocarbons with a view to recovering the microorganisms free from hydrocarbons.

The invention is illustrated with reference to the following examples.

Example 1

The emulsion from which it is desired to extract the yeasts is constituted by cells of *Saccharomyces cerevisiae* and a paraffinic gas oil dispersed in small particles in a continuous aqueous phase of a mineral medium having the following composition:

| | |
|---|---|
| Mono-potassium phosphate _____g__ | 7 |
| Magnesium sulphate _____g__ | 0.2 |
| Sodium chloride _____g__ | 0.1 |
| Ammonium chloride _____g__ | 2.5 |
| Drinking water _____ml__ | 100 |
| Distilled water _____ Balance up to 1,000 ml. | |

The pH of the medium is 4.

*1st operation:* The following experiments were carried out on samples taken from the original emulsion.
(a) Intermittent centrifuging of the emulsion as such gave:
  A pasty phase of yeast cells impregnated with hydrocarbons and with aqueous medium.
  A cloudy phase of aqueous mineral medium.
  A very stable emulsion phase of yeast+mineral medium+hydrocarbons.
  A wet hydrocarbon phase.
(b) There was added to the original emulsion one part per 1,000 by weight with reference to the aqueous phase of the non-ionic surface active agent "Cemulsol," which is a condensate of oleic acid and ethylene oxide, and the mixture vigorously mixed. Centrifuging gave:
  A pasty phase of yeast cells impregnated with hydrocarbons and with aqueous medium.
  A clear phase of aqueous mineral medium.
  A wet hydrocarbon phase.
  Doses of surface active agent below 1 part per 1,000 were less efficient. The above experiments were carried out at a pH of 4.
(c) The pH of the original emulsion was adjusted to 8 and there was added thereto only 0.5 part per 1,000 with reference to the aqueous phase of the same surface active agent. Centrifuging gave the same results as given above under (b). The experiments (a), (b) and (c) were carried out at a temperature of 30° C.
(d) Experiment (c) was repeated at a temperature of 60° C. The separation by centrifuging was clearly better than in experiment (c) since the pasty phase of yeast cells was less rich in hydrocarbons which entered for the greater part into the wet hydrocarbon phase.

*2nd operation:*
(e) The pasty phase of yeast cells impregnated with hydrocarbons and with aqueous mineral medium resulting from (d) was washed with water at 90° C. and centrifuged. There was obtained:
  A pasty phase of yeast cells still containing hydrocarbons with an aqueous phase.
  An aqueous phase containing hydrocarbons. Four successive operations of washing and centrifuging at 90° C. were necesary in order to obtain a paste of yeast cells free from hydrocarbons.
(f) Experiment (e) was repeated but carrying out the washings with water at 60° C. containing 0.5 part per 1,000 of the surface active agent "Cemulsol." Two washings at 60° C. were sufficient in order to obtain a paste of the cells free from hydrocarbons. Finally, the yeast was washed with pure water at 60° C. to eliminate the surface active agent remaining in the yeast.

Example 2

The emulsion from which it was desired to extract the yeasts was constituted by cells of *Candida lipolytica* and paraffinic gas oil finally dispersed in small particles in a continuous aqueous phase of a mineral medium identical to that of Example 1, and having a pH of 3.5.

*1st operation:* The following experiments were carried out on samples taken from the original emulsion:
(a) Intermittent centrifuging at 60° C. of the original emulsion gave a separation as imperfect as that in the case of Example 1, (a).
(b) The pH of the original emulsion was adjusted to 8 and centrifuged at 60° C. The separation was a little better but still quite insufficient.
(c) There was added to the original emulsion 0.25 part per 1,000, with reference to the aqueous phase, of the cationic surface active agent stearyl-trimethyl ammonium chloride and the pH adjusted to 8. The centrifuging was carried out at 60° C. and gave the same three phases which were clearly separated as in Example 1, experiment (d).

*2nd operation:*
(d) The pasty phase of yeast cells impregnated with hydrocarbons from experiment (c) was washed with water at 60° C. and then centrifuged. Five successive washings and centrifugings were necessary to obtain a paste of yeast cells free from hydrocarbons.
(e) Experiment (d) was repeated but carrying out the washing with water containing 0.25 part per 1,000 of the same surface active agent as in experiment (c). Two washings and centrifugings were sufficient to obtain yeasts free from hydrocarbons. A final wash with pure water at 60° C. was carried out to eliminate surface active agent remaining in the yeast.

Example 3

The method described in Example 2 was repeated using as the surface active agent an anionic surface active agent sold under the trade name "Teepol" which is a sodium alkyl sulphate. The dose of "Teepol" was 0.25 part per thousand, based on the weight of the aqueous phase. Substantially the same results were obtained as in Example 2.

Example 4

The products obtained according to Examples 2 and 3 were converted to solid form by heating to 80° C.–90° C. in a rapid current of air and grinding the product to a powder.

We claim:
1. A process for the recovery of yeasts which have been grown in the presence of hydrocarbons, which comprises adding to a mixture of yeast, aqueous mineral medium and hydrocarbon, so obtained, at least 50 parts per million by weight of a surface active agent and thereafter centrifuging, whereby there is obtained a paste comprising yeast and aqueous mineral medium.
2. The process as specified in claim 1 in which the proportion of surface active agent lies in the range 0.02–0.5% by weight, based on the weight of the mixture of yeast, aqueous mineral medium and hydrocarbon.
3. A process as specified in claim 1 in which the surface active agent is a non-ionic agent.
4. A process as specified in claim 1 in which the surface active agent is an anionic agent.
5. A process as specified in claim 1 in which the surface active agent is a cationic agent.
6. A process as specified in claim 1 in which, after adding the surface active agent, the mixture is subjected to vigorous mixing, and, without a further period of growth of the yeast, is thereafter subjected to centrifuging.
7. A process as specified in claim 1 in which the recovered yeast paste is diluted with an aqueous medium and is again centrifuged.
8. A process as specified in claim 7 in which the recovered yeast paste is subjected to a plurality of stages of dilution and centrifuging wherein, in at least one initial stage, the yeast is diluted with an aqueous medium containing surface active agent, and in at least one subsequent stage the yeast is diluted with an aqueous medium free of surface active agents.

9. A process as specified in claim 8 in which the yeast, recovered after the plurality of stages of dilution and centrifuging, is washed with water and again centrifuged.

10. A process as specified in claim 1 wherein the pH of the mixture to be treated is below 7, in which the value of the pH is raised to between 7 and 9 before centrifuging.

11. A process as specified in claim 1 in which separation of the yeast paste is carried out at a temperature in the range 30° C.–99° C.

12. A process as specified in claim 11 in which the recovered yeast paste is dried to a biologically stable state.

13. A process as specified in claim 1 in which the mixture of yeast, aqueous mineral medium and hydrocarbon, has been produced by maintaining a yeast in a nutrient medium in the presence of a paraffinic feedstock of petroleum origin and a free oxygen-containing gas, under conditions favouring growth of the yeast, said feedstock having an average molecular weight corresponding to at least 10 carbon atoms per molecule and thereafter separating the yeast from the aqueous medium.

14. A process as specified in claim 13 in which the yeast is of the sub-family Candida.

15. A process as specified in claim 14 in which the yeast is *Candida lipolytica*.

References Cited by the Examiner

Cook: "The Chemistry and Biology of Yeasts," Academic Press Inc., New York, 1958, pp. 648–659.

A. LOUIS MONACELL, *Primary Examiner.*

ABRAHAM H. WINKELSTEIN, *Examiner.*